(12) United States Patent
Lee

(10) Patent No.: US 9,546,732 B2
(45) Date of Patent: Jan. 17, 2017

(54) GEAR-SHIFTING DEVICE FOR VEHICLE

(71) Applicant: Hyundai Motor Company, Seoul (KR)

(72) Inventor: Kyung Woo Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 140 days.

(21) Appl. No.: 14/330,431

(22) Filed: Jul. 14, 2014

(65) Prior Publication Data

US 2015/0167841 A1    Jun. 18, 2015

(30) Foreign Application Priority Data

Dec. 18, 2013   (KR) ........................ 10-2013-0157738

(51) Int. Cl.
| | |
|---|---|
| *F16H 61/18* | (2006.01) |
| *F16H 63/20* | (2006.01) |
| *F16H 59/04* | (2006.01) |
| *F16H 59/10* | (2006.01) |
| *F16H 59/02* | (2006.01) |
| *F16H 61/68* | (2006.01) |
| *F16B 19/00* | (2006.01) |
| *F16H 63/30* | (2006.01) |

(Continued)

(52) U.S. Cl.
CPC .......... *F16H 63/20* (2013.01); *F16H 59/0278* (2013.01); *F16H 59/04* (2013.01); *F16H 59/10* (2013.01); *F16B 19/004* (2013.01); *F16H 61/68* (2013.01); *F16H 2059/026* (2013.01); *F16H 2061/242* (2013.01); *F16H 2063/208* (2013.01); *F16H 2063/3083* (2013.01); *F16H 2063/3086* (2013.01); *F16H 2063/322* (2013.01); *F16H 2200/0056* (2013.01); *F16H 2306/14* (2013.01); *Y10T 74/20177* (2015.01)

(58) Field of Classification Search
CPC .......... B60K 20/04; F16H 59/10; F16H 59/04; F16H 59/0278; F16H 2059/026; F16H 2063/208; F16H 2063/3083; F16H 2063/3086; F16H 2063/322; F16H 63/20; F16H 2306/14; F16H 2061/242; F16H 2200/0056; F16H 61/68; F16B 19/004
USPC .... 74/473.21, 473.24, 473.25, 473.36, 473.1
See application file for complete search history.

(56) References Cited

U.S. PATENT DOCUMENTS

2005/0235770 A1 * 10/2005 Schaefer ................. F16H 61/24
74/473.25

FOREIGN PATENT DOCUMENTS

| EP | 1235006 A1 * | 8/2002 | ............ F16H 61/18 |
|---|---|---|---|
| FR | 2914038 A1 * | 9/2008 | ............ F16H 61/24 |
| JP | DE 4424543 A1 * | 1/1995 | ............ F16H 63/20 |

(Continued)

*Primary Examiner* — William C Joyce
*Assistant Examiner* — Randell J Krug
(74) *Attorney, Agent, or Firm* — Mintz Levin Cohn Ferris Glovsky and Popeo, P.C.; Peter F. Corless

(57) ABSTRACT

A gear-shifting device for a vehicle is provided and includes a guide body that has a first end portion connected to a control shaft, installed so that a second end portion is rotated at the first end portion as an axis in a rotational displacement that corresponds to a selecting path to perform a selecting operation, and installed to be moved in a substantially straight displacement that corresponds to a shifting path along an axis direction of the first end portion to perform a shifting operation. A guide unit is disposed to distinguish each shifting path on the selecting path in which the second end portion of the guide body is rotated and is configured to guide the second end portion of the guide body to be movable along the shifting path.

11 Claims, 6 Drawing Sheets

(51) Int. Cl.
　　　*F16H 63/32*　　　(2006.01)
　　　*F16H 61/24*　　　(2006.01)

(56)　　　　　　References Cited

FOREIGN PATENT DOCUMENTS

| | | |
|---|---|---|
| JP | 2009-281574 A | 12/2009 |
| JP | WO 2012164646 A1 * | 12/2012 ............ F16H 63/20 |
| JP | 2013-087813 A | 5/2013 |
| KR | 10-1998-0047235 | 9/1998 |
| KR | 10-2003-0050107 | 6/2003 |
| KR | 10-2005-0101703 | 10/2005 |
| KR | 10-2008-0107568 A | 12/2008 |
| KR | 10-2009-0118138 | 11/2009 |

* cited by examiner

GEAR-SHIFTING DEVICE FOR VEHICLE

CROSS REFERENCE TO RELATED APPLICATION

The present application claims priority of Korean Patent Application Number 10-2013-0157738 filed on Dec. 18, 2013, the entire contents of which is incorporated herein for all purposes by this reference.

BACKGROUND

1. Technical Field

The present invention relates to a gear-shifting device for a vehicle, and more particularly, to a gear-shifting device for a vehicle that prevents a gear-shifting lever from being improperly shifted to seventh-gear when being abruptly gear-shifted to third or fifth-gear while more accurately performing a manual gear shift to a driver intended gear-shifting level.

2. Description of the Related Art

A manual gear-shifting device is installed between a clutch and a differential gear and is provided to appropriately gear-shift driving force of an engine based on a driving state of a vehicle and a gear-shifting lever is installed within an interior of the vehicle to allow a driver to perform a gear-shifting operation. This manual gear-shifting device is a structure in which the gear-shift lever installed within the interior side of the vehicle and a gear-shifting operation mechanism are connected to each other via a cable. When the driver operates the gear-shifting lever, a shift case and a select cable are operated to operate the gear-shifting operation mechanism, thereby performing a gear-shifting operation.

Recently, to satisfy driver's desire for a gear-shifting device having multiple gears, an increase in output torque and power of the vehicle, and an improvement in driving performance of the vehicle, a gear-shifting device having a high-level of gear-shifting level of seven gear or more has been developed. FIG. 1 shows an exemplary manual gear-shifting gate of a seven gear manual gear-shifting device, when in order to gear-shift to seventh-gear, the gear-shifting to seventh-gear is generally performed by selecting and shifting the gear-shifting lever to seventh-gear from a fifth or sixth-gear gear-shifting level position.

However, when attempting to gear-shift from first-gear to fourth-gear and reverse gear (R-gear) to fifth or sixth-gear, the gear-shifting lever may be improperly shifted to seventh-gear without passing through fifth-gear due to an excessive operation of the gear-shifting lever. Accordingly, when the gear-shifting lever is improperly shifted directly from a low gear to seventh-gear, revolutions per minute (RPM) of an engine may be rapidly decreased or the vehicle may stall due to an abrupt gear-shift which may not be intended by the driver and a gear ratio difference, such that passenger safety may not be guaranteed.

The matters described as the related art have been provided merely for assisting in the understanding for the background of the present invention and should not be considered as corresponding to the related art known to those skilled in the art.

SUMMARY

The present invention provides a gear-shifting device for a vehicle that prevents a gear-shifting lever from being improperly shifted to seventh-gear when being abruptly gear-shifted to third or fifth-gear while more accurately performing a manual gear shift to a driver intended gear-shifting level.

According to an exemplary embodiment of the present invention, a gear-shifting device for a vehicle may include: a manual gear-shifting gate having a plurality of gear-shifting levels disposed one by one in a plurality of substantially straight passages vertically connected to one side or both sides along a neutral line and a diagonal passage diagonally formed from an end portion of the neutral line connected to an outermost substantially straight passage to an intermediate end of a lower substantially straight passage provided to one side of the outermost substantially straight passage. An uppermost gear-shifting level may be disposed in the outermost substantially straight passage, and two gear-shifting levels below the uppermost gear-shifting level may each be disposed in the lower substantially straight passage provided to one side of the outermost substantially straight passage. A point of the neutral line connected to the outermost substantially straight passage and a point of the neutral line connected to the lower substantially straight passage may have a closed shape formed therebetween.

According to another exemplary embodiment of the present invention, a gear-shifting device for a vehicle may include: a guide body having one end portion (e.g., a first end portion) connected to a control shaft, installed so that the other end portion (e.g., a second end portion) is rotated at one end portion as an axis in a rotational displacement that corresponds to a selecting path to perform a selecting operation, and installed to be moved in a substantially straight displacement that corresponds to a shifting path along an axis direction of one end portion to perform a shifting operation; and a guide unit provided to distinguish each shifting path on the selecting path in which the other end portion of the guide body is rotated and configured to guide the other portion of the guide body to be movable along the shifting path.

The guide body may have a path guiding groove formed at a substantial center of the other end portion thereof and shifting parts may be formed at both ends of the path guiding groove. The guide unit may include: a guide plate installed at the other end portion side of the guide body; and a guide protrusion and a guide groove alternately provided at an end portion of the guide plate along a rotating path of the other end portion of the guide body, wherein upon rotating the guide body, the guide protrusion or the guide groove may be positioned in the path guiding groove of the guide body. Both sides of an inner end of the shifting part and both sides of an outer end of the guide protrusion may include a plurality of champers having a gradient that corresponds to each other upon contact.

The gear-shifting device may further include a stopper unit having a stopper plate rotatably disposed at an end portion position of the selecting path in which the other end portion of the guide body is rotated, the stopper plate may be configured to block the other end portion of the guide body from being positioned at the selecting path connected to an uppermost shifting path when the guide body rotates along the selecting path, when the guide body is moved to a lower shifting path disposed at one side of the uppermost shifting path to perform the shifting operation, and is then rotated and moved toward the selecting path connected to the uppermost shifting path, the stopper plate may be caught (e.g., stopped) by the guide body to be rotated together with the guide body and may position the other end portion of the guide body at the selecting path connected to the uppermost shifting path, and the other end portion of the guide body may be moved to the uppermost shifting path to perform the shifting operation.

The stopper unit may include: a stopper guide formed to protrude at an intermediate end of the guide body; a supporting plate disposed at an end portion of the rotating path in which the stopper guide may be rotated; and a stopper plate rotatably coupled to a shaft of the supporting plate and having a stopper protrusion formed to be protruded at an end portion toward the stopper, wherein the stopper protrusion may be formed at a position at which the stopper guide may be caught when the other end portion of the guide body is positioned in the lower shifting path provided to one side of the uppermost shifting path.

The gear-shifting device may further include a return spring provided to the shaft and having both end portions supported by the stopper plate and the supporting plate, respectively, to provide elastic restoring force to the stopper plate when the stopper plate is rotated. In addition, catching grooves may be formed to be depressed (e.g., concave shape) at both sides of the stopper protrusion and return protrusions may be formed to be protruded at side portions of the catching grooves. A seating groove may be formed in a concave shape at an intermediate end of the stopper protrusion to catch (e.g., stop) the stopper guide. Supporting protrusions may be formed on an outer surface of the stopper plate and an outer surface of the supporting plate, respectively, the return spring may be inserted into a pin member axially coupling the stopper plate and the supporting plate, and the respective supporting protrusions may elastically support both ends of the return spring. The supporting plate and the guide plate may be formed integrally with each other.

According to another exemplary embodiment of the present invention, a gear-shifting device for a vehicle performing a gear-shifting operation based on the manual gear-shifting gate as described above may include: a guide body having one end portion (e.g., a first end portion) connected to a control shaft, installed so that the other end portion (e.g., a second end portion) is rotated at the first end portion as an axis in a rotational displacement that corresponds to a selecting path to perform a selecting operation along the neutral line and the diagonal passage of the manual gear-shifting gate, and installed to be moved in a substantially straight displacement that corresponds to a shifting path along an axis direction of the first end portion to perform a shifting operation along the substantially straight passage.

Further, a guide unit may be disposed to distinguish each shifting path on the selecting path in which the second end portion of the guide body may be rotated and configured to guide the second end portion of the guide body to be movable along the shifting path; and a stopper unit having a stopper plate rotatably disposed at an end portion position of the selecting path in which the second end portion of the guide body may be rotated, the stopper plate may be configured to block the other second portion of the guide body from being positioned at the selecting path connected to an outermost substantially straight passage when the guide body rotates along the selecting path, when the guide body performs a shifting operation to a gear-shifting level that corresponds to a lower substantially straight passage, and is then rotated and moved toward the selecting path connected to the outermost substantially straight passage, the stopper plate may be rotated and may be configured to allow a gear-shifting level disposed at the outermost straight passage to be shifted.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
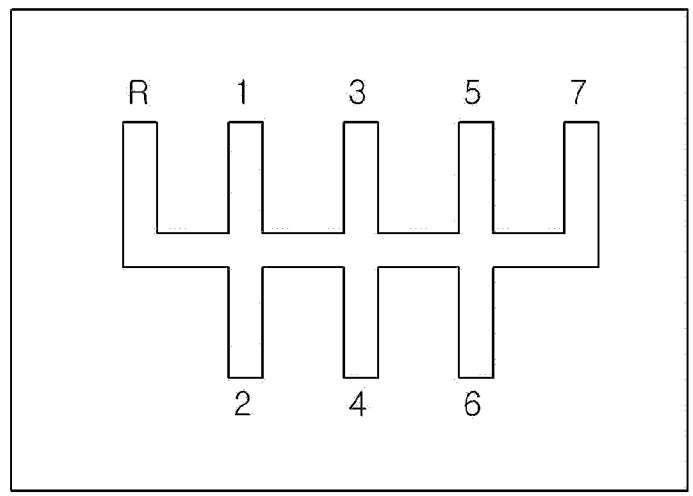
FIG. 1 is an exemplary view showing a seventh shift manual gear-shifting gate according to the related art.
Figure 2:
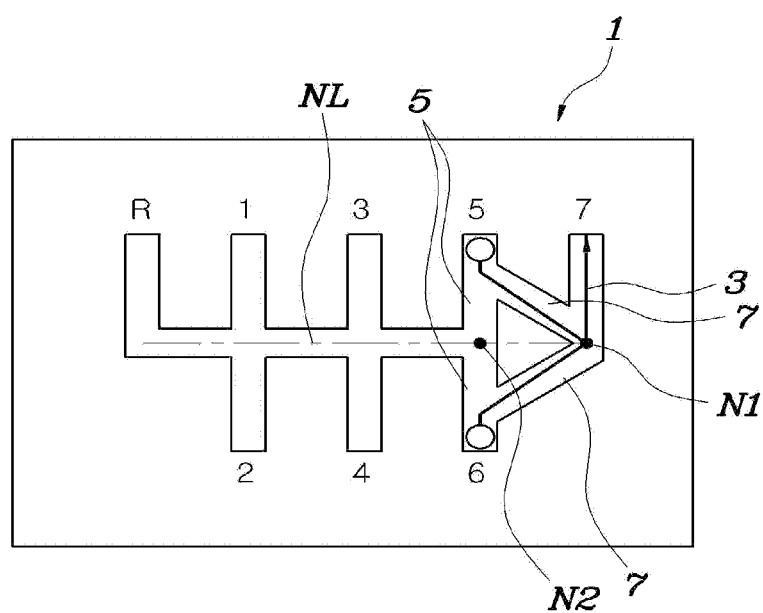
FIG. 2 is an exemplary view showing a seventh shift manual gear-shifting gate according to an exemplary embodiment of the present invention.
Figure 3:
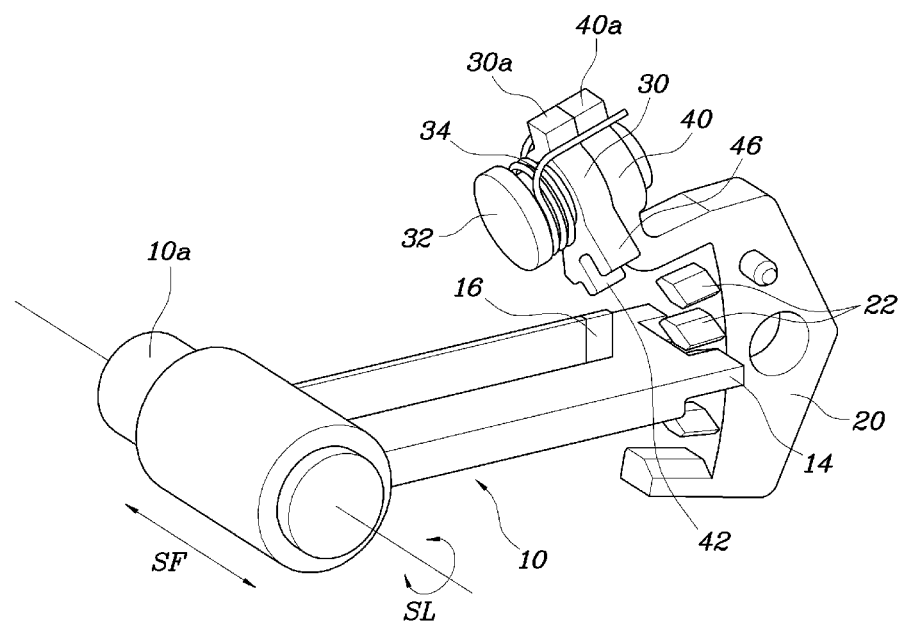
FIG. 3 is an exemplary view showing a configuration of a gear-shifting device for a vehicle according to an exemplary embodiment of the present invention.
Figure 4:
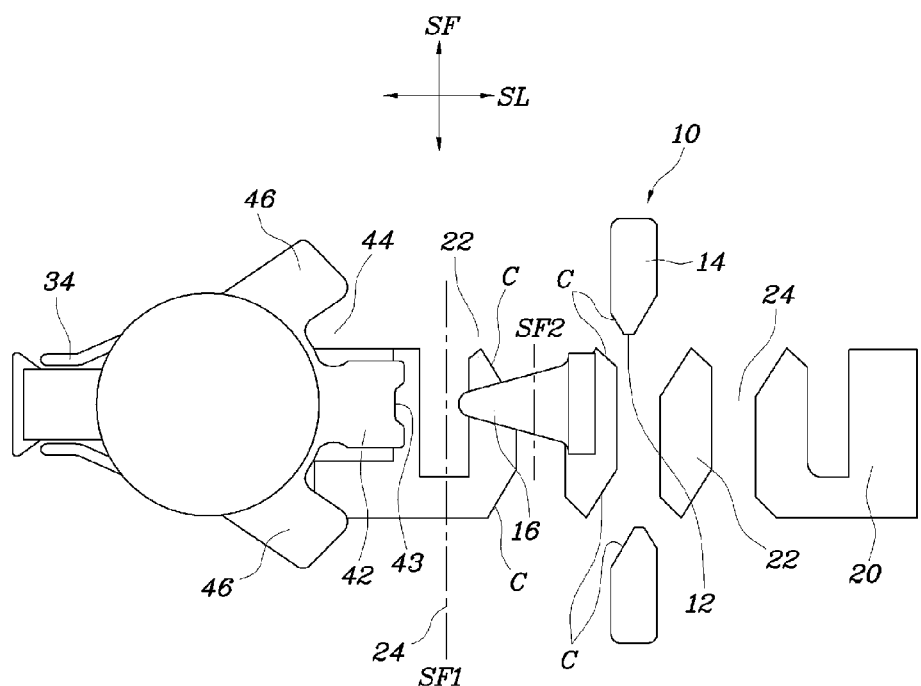
FIG. 4 is an exemplary view describing a structure of a gear-shifting device for a vehicle according to an exemplary embodiment of the present invention.
Figure 5:
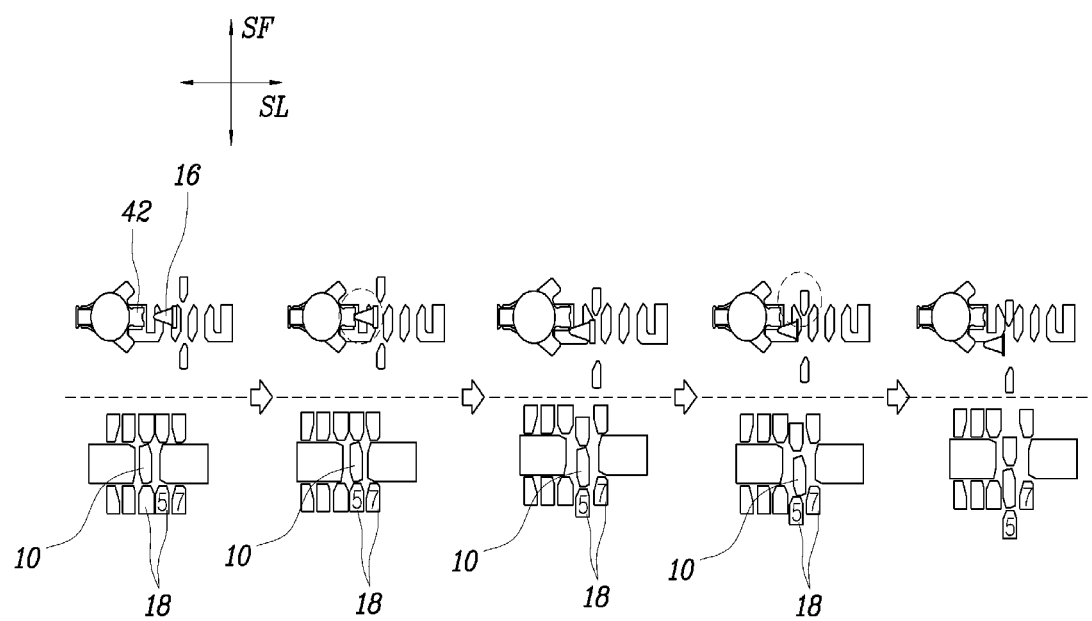
FIG. 5 is an exemplary view describing a principle in which a seventh-gear gear-shifting is blocked by a stopper unit in the gear-shifting device for the vehicle according to an exemplary embodiment of the present invention.
Figure 6:
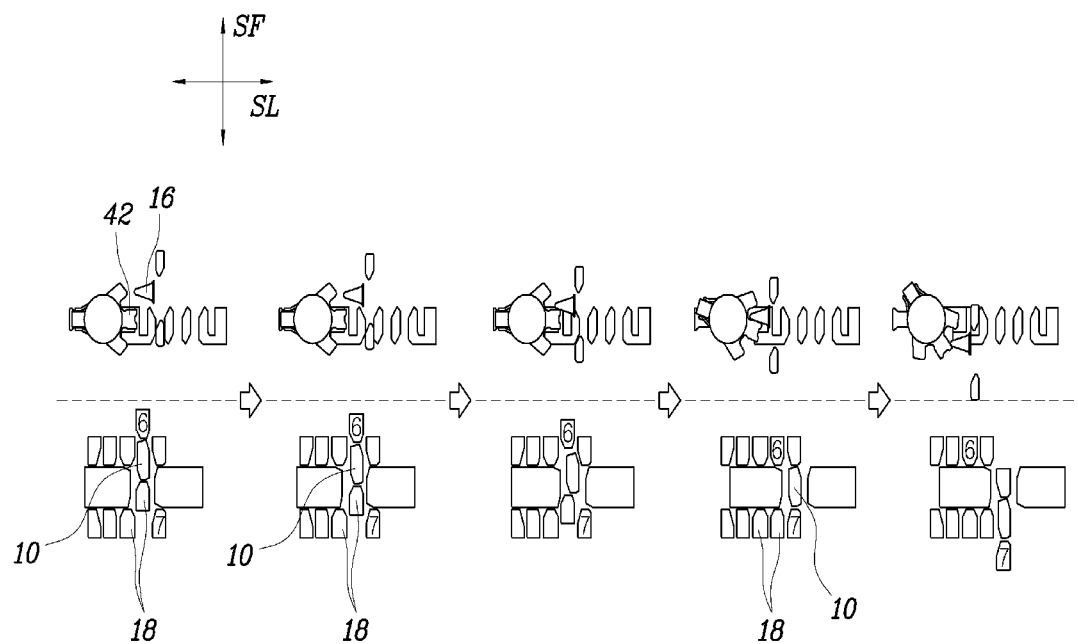
FIG. 6 is an exemplary view describing a process in which a gear shifting lever is shifted from sixth-gear to seventh-gear in the gear-shifting device for the vehicle according to an exemplary embodiment of the present invention.
Figure 7:
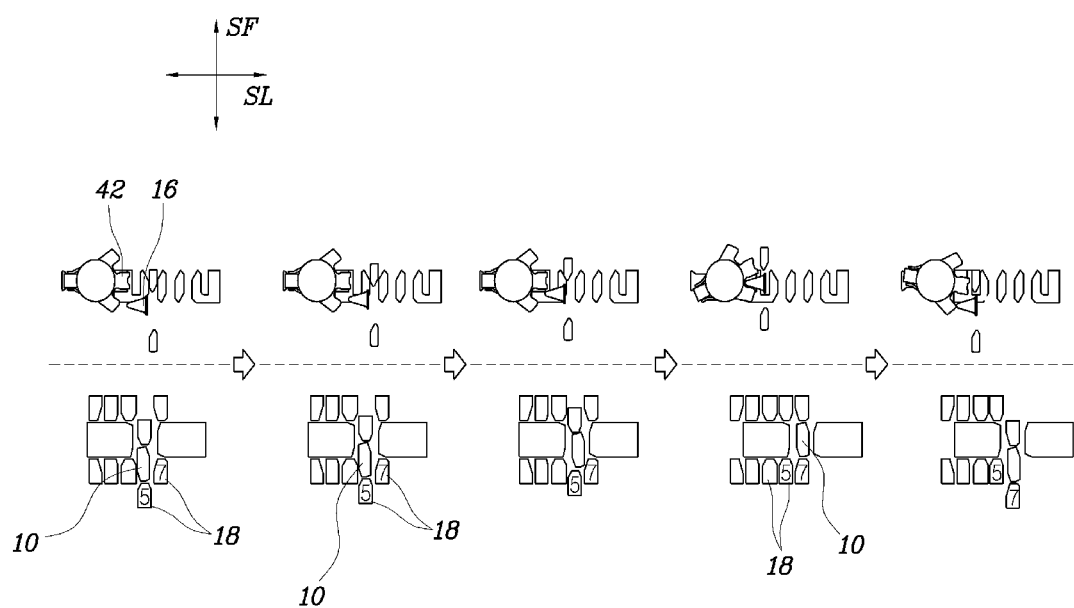
FIG. 7 is an exemplary view describing a process in which a gear shifting lever is shifted from fifth-gear to seventh-gear in the gear-shifting device for the vehicle according to an exemplary embodiment of the present invention.

An exemplary embodiment of the present invention will be described in detail with reference to the accompanying drawings. FIG. 2 is an exemplary view showing a seventh shift manual gear-shifting gate according to an exemplary embodiment of the present invention, FIG. 3 is an exemplary view showing a configuration of a gear-shifting device for a vehicle according to an exemplary embodiment of the present invention, FIG. 4 is an exemplary view describing a structure of a gear-shifting device for a vehicle according to an exemplary embodiment of the present invention, FIG. 5 is an exemplary view describing a principle in which a seventh-gear gear-shifting is blocked by a stopper unit in the gear-shifting device for the vehicle according to an exemplary embodiment of the present invention, FIG. 6 is an exemplary view describing a process in which a gear shifting lever is shifted from sixth-gear to seventh-gear in the gear-shifting device for the vehicle according to an exemplary embodiment of the present invention, and FIG. 7 is an exemplary view describing a process in which a gear shifting lever is shifted from fifth-gear to seventh-gear in the gear-shifting device for the vehicle according to an exemplary embodiment of the present invention.

The gear-shifting device for the device according to the exemplary embodiment of the present invention will be described with reference to FIG. 2. The gear-shifting device for the device may include a manual gear-shifting gate 1 having a plurality of gear-shifting levels disposed one by one (e.g., sequentially) in a plurality of substantially straight passages vertically connected to one side or both sides along a neutral line NL and a diagonal passage 7 diagonally formed from an end portion of the neutral line NL connected to an outermost straight passage 3 to an intermediate end of a lower straight passage 5 provided to one side of the outermost straight passage 3. In other words, first-gear to seventh-gear and R-gear may be separately disposed in the substantially straight passages, respectively, seven gear may be disposed in the outermost straight passage 3, and fifth-gear and sixth-gear may be disposed at both end portions of the lower straight passage 5.

Therefore, when performing the gear-shifting to seventh-gear when fifth-gear or sixth-gear is formed, the gear-shifting lever may be moved by a predetermined length along the corresponding lower straight passage 5 and may then be positioned at a neutral point connected to the straight passage 3 of seventh-gear along the diagonal passage. Further, the gear-shifting lever may be moved along the substantially straight passage 3 in which seventh-gear is disposed, to shift to seventh-gear.

According to the exemplary embodiment of the present invention, an uppermost gear-shifting level may be disposed in the outermost straight passage 3 and two gear-shifting levels below the uppermost gear-shifting level may each be disposed in the lower straight passage 5 provided to one side of the outermost straight passage 3. In other words, seventh-gear may be disposed in the outermost straight passage 3 and fifth-gear and sixth-gear may each be disposed at both sides of the lower straight passage 5.

According to the exemplary embodiment of the present invention, a point N1 of the neutral line NL connected to the outermost straight passage 3 and a point N2 of the neutral line NL connected to the lower straight passage 5 may have a closed shape formed therebetween. In other words, although a gear-shifting operation from R-gear and first-gear to fourth-gear to fifth-gear or sixth-gear may be performed abruptly, since the neutral point N2 connected to the straight passage 5 of fifth-gear and sixth-gear may be separated from the neutral point N1 connected to the straight passage 3 of seventh-gear, a mal-operation of the gear-shifting lever to the neutral point of seventh-gear may be prevented.

FIG. 3 is an exemplary view showing a gear-shifting device for a vehicle in which the gear-shifting operation is performed based on the manual gear-shifting gate 1 shown in FIG. 2. The gear-shifting device for the device according to the exemplary embodiment of the present invention will be described with reference to FIGS. 3 and 4. The gear-shifting device for the device may include a guide body 10 having one end portion (e.g., a first end portion) connected to a control shaft, installed so that the other end portion (e.g., a second end portion) may be rotated at the first end portion as an axis in a rotational displacement that corresponds to a selecting path SL to perform a selecting operation, and may be installed to be moved in a substantially straight displacement that corresponds to a shifting path SF along an axis direction of the first end portion to perform a shifting operation; and a guide unit disposed to distinguish each shifting path SF on the selecting path SL in which the second end portion of the guide body 10 may be rotated and may be configured to guide the second end portion of the guide body 10 to be movable along the shifting path SF.

In particular, the control shaft may be directly coupled to the guide body 10 and may be connected to the guide body 10 to be interworked with each other by a link. In other words, when the selecting operation of the gear-shifting lever is performed to perform the gear-shifting of vehicle, the second end portion of the guide body 10 connected to the control shaft may be rotated. Additionally, when the shifting operation of the gear-shifting lever to the corresponding gear-shifting level is performed, the control shaft may be moved and the guide body 10 connected to the control shaft may be moved in the substantially straight displacement. In particular, a plurality of shift lugs 18 may be installed in each shifting path SF in a shape that receives the second end portion of the guide body 10. Therefore, as the guide body 10 is moved in the substantially straight displacement, each shift lug 18 may be moved to a gear-shifting position to implement the corresponding gear-shifting level, thereby implementing the gear-shifting. Thus, the selecting operation and the shifting operation may be performed based on the rotational displacement and substantially straight displacement motion of the guide body 10, to more accurately perform the gear shifting to the driver intended gear-shifting level.

According to the exemplary embodiment of the present invention, the guide body 10 may have a path guiding groove 12 formed at an intermediate end of the second end portion and a plurality of shifting parts 14 may be formed in a protruded shape at both ends of the path guiding groove 12. In addition, the guide unit may include a guide plate 20 installed at the second end portion side of the guide body 10; and a guide protrusion 22 and a guide groove 24 alternately disposed at an end portion of the guide plate 20 along a rotating path of the second end portion of the guide body 10. In particular, when the guide body 10 is rotated, the guide protrusion 22 or the guide groove 24 may be disposed in the path guiding groove 12 of the guide body 10. The guide groove 24, which may be a space disposed between the guide protrusions 22, may overlap with a portion of the shifting path SF.

In addition, since the shifting part 14 may be moved along the guide groove 24 in the shifting path SF to push each shift lug 18, the shifting part 14 may be formed to have a width less than or at least equal to a width of the guide groove 24. In other words, when the guide body 10 is rotated, since the guide protrusion 22 or the guide groove 24 is disposed in the path guiding groove 12 of the guide body 10, the guide body 10 may perform a selecting movement along the selecting path SL. In addition, when the second end portion of the guide body 10 may be disposed at a position of the shifting path SF in which the intended gear-shift level to be shifted may be formed, the shifting portion 14 may be shifting-moved through the guide groove 24, to perform the gear-shifting.

Referring to FIGS. 3 and 4, the gear-shifting device for the vehicle according to the exemplary embodiment of the present invention may include a stopper unit configured so that a stopper plate 40 may be rotatably disposed at an end portion position of the selecting path SL in which the second end portion of the guide body 10 may be rotated, the stopper plate 40 may be configured to block the second end portion of the guide body 10 from being positioned at the selecting path SL connected to an uppermost shifting path SF1 when the guide body 1 rotates along the selecting path SL, when the guide body 10 is moved to a lower shifting path SF2 disposed at one side (e.g., a first side) of the uppermost shifting path SF1 to perform the shifting operation, and may then be rotated and moved toward the selecting path SL connected to the uppermost shifting path SF1, the stopper plate 40 may be caught (e.g., stopped) by the guide body 10 to be rotated together with the guide body 10 and may position the second end portion of the guide body 10 at the selecting path SL connected to the uppermost shifting path SF1, and the second end portion of the guide body 10 may be moved to the uppermost shifting path SF1 to perform the shifting operation.

Particularly, the uppermost shifting path SF1 may be a seventh-gear gear shifting path and the lower shifting path SF2 may be a shifting path that performs a fifth-gear gear-shifting and a sixth-gear gear-shifting. In addition, the uppermost shifting path SF1 may be formed at a position closest to the stopper plate 40. Specifically, the stopper unit may include a stopper guide 16 formed protruding at an intermediate end of the guide body 10; a supporting plate 30 disposed at an end portion of the rotating path in which the stopper guide 16 is rotated; a stopper plate 40 rotatably coupled to a shaft of the supporting plate 30 and having a stopper protrusion 42 formed protruding at an end portion toward the stopper; and a return spring 34 provided to the shaft and having both end portions supported by the stopper plate 40 and the supporting plate 30, respectively, to provide elastic restoring force to the stopper plate 40 when the stopper plate 40 is rotated.

In particular, the stopper protrusion 42 may be formed at a position at which the stopper guide 16 may be caught (e.g., stopped) when the second end portion of the guide body 10 is positioned in the lower shifting path provided to one side of the uppermost shifting path. In addition, a seating groove 43 may be formed in a concave shape at an intermediate end of the stopper protrusion 42 to catch (e.g., stop) the stopper guide 16. In other words, the protruded end portion of the stopper guide 16 may be caught when the stopper guide 16 is seated and supported in the seating groove 43 of the stopper protrusion 42, to more reliably limit the selecting movement of the stopper guide 16.

According to the exemplary embodiment of the present invention, a plurality of supporting protrusions 30a and 40a may be formed on an outer surface of the stopper plate 40 and an outer surface of the supporting plate 30, respectively, the return spring 34 may be inserted into a pin member 32 axially coupling the stopper plate 40 and the supporting plate 30, and the supporting protrusions 30a and 40a may elastically support both ends of the return spring 34. In other words, the return spring 34, which may be a torsion spring, may have one end (e.g., a first end) supported on one surface (e.g., a first surface) of the supporting protrusion 40a formed on the stopper plate 40 and the other end (e.g., a second end) supported on the other surface (e.g., a second surface) of the supporting protrusion 30a formed on the supporting plate 30. Therefore, when the stopper plate 40 is rotated, both ends of the return spring 34 may be separated to generate elastic restoring force in the return spring 34 and elastic restoring force may be provided to the rotated stopper plate 40, to elastically restore the stopper plate 40 to a state before the stopper plate 40 is rotated.

According to the exemplary embodiment of the present invention, a plurality of catching grooves 44 may be formed to be depressed at both sides of the stopper protrusion 42 and return protrusions 46 may be formed protruding at side portions of the catching grooves 44. In other words, after performing the seventh-gear gear-shifting, when the guide body 10 is returned (e.g., to an original position), the stopper guide 16 may be configured to push the return protrusions 46 to assist a restoring movement of the rotated stopper plate 40. In particular, the supporting plate 30 and the guide plate 20 may be integrally formed. In other words, the guide unit and the stopper unit may be integrated to simplify a structure that prevents the mal-operation and the number of part may be reduced thereby decreasing costs and weight.

Meanwhile, a configuration in which the gear-shifting operation is performed based on the manual gear-shifting gate 1 shown in FIG. 2 will be described.

The gear-shifting device for the vehicle according to the exemplary embodiment of the present invention may include a guide body 10 having one end portion (e.g., a first end) connected to a control shaft, installed so that the other end portion (e.g., a second end) may be rotated at the first end portion as an axis in a predetermined rotational displacement to perform a selecting operation along a neutral line NL and a diagonal passage 7 of a manual gear-shifting gate 1, and installed to be moved in a predetermined substantially straight displacement along an axis direction of the first end portion to perform a shifting operation along a substantially straight passage; a guide unit disposed to distinguish each shifting path SF on a selecting path SL in which the second end portion of the guide body 10 may be rotated and may be configured to guide the second portion of the guide body 10 to be movable along the shifting path SF; and a stopper unit having a stopper plate 40 rotatably disposed at an end portion position of the selecting path SL in which the second end portion of the guide body 10 may be rotated. The stopper plate 40 may be configured to block the second end portion of the guide body 10 from being positioned at the selecting path SL connected to an uppermost shifting path SF1 when the guide body 10 rotates along the selecting path SL, when the guide body 10 performs a shifting operation to a gear-shifting level that corresponds to a lower straight passage 5, and may then be rotated and moved toward the selecting path SL connected to the outermost straight passage 3, the stopper plate 40 may be rotated and may be configured to allow a gear-shifting level disposed at the outermost straight passage 3 to be shifted.

Furthermore, a seventh-gear mal-operation preventing operation by the stopper unit will be described with reference to FIG. 5.

When performing the selecting operation to directly shift the gear-shifting lever positioned at first-gear to fourth-gear and R-gear to seventh-gear without passing through fifth-gear or sixth-gear, the second end portion of the guide body 10 may be rotated toward the uppermost shifting path SF1, that is, the shifting path for a seventh-gear gear-shifting along the selecting path SL. In particular, the stopper guide 16 formed on the guide body 10 may be caught by the stopper protrusion 42 formed on the stopper plate 40 and may be stopped on the lower shifting path SF2 for a fifth-gear and sixth-gear gear-shifting.

Additionally, when interference between the stopper guide 16 and the stopper protrusion 42 is released by performing the shifting operation of the guide body 10 to a fifth-gear or sixth-gear gear-shifting position, a significant portion of an inner end of the shifting part 14 may be entered into the guide groove 24 in the corresponding shifting path SF, such that the guide protrusion 22 and the guide groove 24 contact when significant portions thereof are overlapped. Therefore, since a selecting motion to a seventh-gear shifting path side may be disabled, the shifting part 14 may be entered into the guide groove 24 of fifth-gear or sixth-gear in which an initial shifting may be performed, thereby completing the gear-shifting to fifth-gear or sixth-gear.

Both sides of the inner end of the shifting part 14 and both sides of an outer end of the guide protrusion 22 may include a plurality of champers having a gradient that corresponds to each other upon contact. In other words, due to a shape of the champers formed at the shifting part 14 and the guide protrusion 22, the shifting part 14 entered into the guide groove 24 of fifth-gear and sixth-gear may be guided by the guide protrusion 22, to guide the gear-shifting to fifth-gear or sixth-gear. Therefore, although the gear-shift lever may be abruptly operated from first-gear to fourth-gear and R-gear to fifth-gear or sixth-gear, the gear-shifting to seventh-gear may be mechanically prevented by the stopper unit, such that damage to a drive train such as a gear train, a clutch, and the like caused by the gear-shifting mal-operation may be prevented.

Operation processes in which the gear-shifting lever is shifted from fifth-gear or sixth-gear to seventh-gear will be described with reference to FIGS. 6 and 7.

When the gear-shifting lever is operated to a seventh-gear shifting path position to shift the gear-shifting lever positioned at five gear or sixth-gear to seventh-gear, the second end portion of the guide body 10 may be rotated and moved toward the selecting path SL connected to the uppermost shifting path SF1. In particular, since both sides of the inner end of the shifting part 14 and both sides of the outer end of the guide protrusion 22 may include the champers that have the gradient that corresponds to each other upon contact, the shifting part 14 positioned in the guide groove 24 of fifth-gear or sixth-gear may be guided by the guide protrusion 22 and may be positioned on the selecting path SL of seventh-gear. In other words, the gear-shifting lever may enter into the diagonal passage of FIG. 2 and may be moved toward the neutral point N1 connected to the seventh-gear gear-shifting level.

By the movement of the guide body 10 as described above, the end portion of the stopper guide 16 may protrude out of the end portion position of the stopper protrusion 42 and may contact a side of the stopper protrusion 42. Further, the stopper guide 16 may be configured to push the stopper protrusion 42, such that the stopper plate 40 may be rotated and the second end portion of the guide body 10 may be positioned in the selecting path SL connected to the seventh-gear shifting path. When performing the shifting movement of the guide body 10 toward the seventh-gear shifting path, the stopper guide 16 may be configured to further push the stopper plate 40 to be further rotated, thereby completing the seventh-gear gear-shifting. Therefore, since the seventh-gear gear-shifting may be enabled when the gear-shifting lever is positioned in fifth-gear or sixth-gear, gear-shifting clarity for the seventh-gear gear-shifting may be improved and the mal-operation according to the seventh-gear gear-shifting may be prevented.

According to the exemplary embodiment of the present invention, the gear-shift to the driver intended gear-shifting level may be more accurately performed by performing the selecting operation and the shifting operation according to the rotational displacement and linear displacement motions of the guide body. Particularly, when the gear-shifting lever is abruptly shifted from first-gear to fourth-gear and R-gear to fifth-gear or sixth-gear, since the gear-shifting of the gear-shift lever to seventh-gear may be mechanically prevented by the stopper unit, damage to the drive train such as a gear train, the clutch, and the like caused by the gear-shifting mal-operation may be prevented.

Meanwhile, although examples of the present invention have been described above in detail, it is obvious to those skilled in the art that various modifications and alterations may be made without departing from the spirit and scope of the present invention. In addition, it is obvious that these modifications and alterations are within the following claims.

What is claimed is:

1. A gear-shifting device for a vehicle, the gear-shifting device comprising:
   a guide body having a first end portion connected to a control shaft, installed so that a second end portion of the guide body is rotated at the first end portion as an axis in a rotational displacement that corresponds to a selecting path to perform a selecting operation, and installed to be moved in a substantially straight displacement corresponding to a shifting path along an axis direction of the first end portion to perform a shifting operation;
   a guide unit disposed to distinguish each shifting path on the selecting path in which the second end portion of the guide body is rotated and configured to guide the second portion of the guide body to be movable along the shifting path; and
   a stopper unit having a stopper plate rotatably disposed at an end portion position of the selecting path in which the second end portion of the guide body is rotated,
   wherein the stopper plate is configured to block the second end portion of the guide body from being positioned at the selecting path connected to an uppermost shifting path when the guide body rotates along the selected path, and
   wherein when the guide body is moved to a lower shifting path disposed at one side of the uppermost shifting path to perform the shifting operation, and is then rotated and moved toward the selecting path connected to the uppermost shifting path, the stopper plate is caught by the guide body to be rotated together with the guide body and is configured to position the second end portion of the guide body at the selecting path connected to the uppermost shifting path, and the second end portion of the guide body is moved to the uppermost shifting path to perform the shifting operation.

2. The gear-shifting device of claim 1, wherein the guide body has a path guiding groove formed at a substantial center of the second end portion and shifting parts are formed at both ends of the path guiding groove.

3. The gear-shifting device of claim 2, wherein the guide unit includes:
   a guide plate installed at the second end portion side of the guide body; and
   a guide protrusion and a guide groove alternately disposed at an end portion of the guide plate along a rotating path of the second end portion of the guide body,
   wherein upon rotating the guide body, the guide protrusion or the guide groove is positioned in the path guiding groove of the guide body.

4. The gear-shifting device of claim 3, wherein both sides of an inner end of the shifting part and both sides of an outer end of the guide protrusion include a plurality of chamfers having a gradient that corresponds to each other upon contact.

5. The gear-shifting device of claim 1, wherein the stopper unit includes:
   a stopper guide formed protruding at an intermediate end of the guide body;

a supporting plate disposed at an end portion of the rotating path in which the stopper guide is rotated; and
a stopper plate rotatably coupled to a shaft of the supporting plate and having a stopper protrusion formed to be protruded at an end portion toward the stopper,
wherein the stopper protrusion is formed at a position at which the stopper guide is caught when the second end portion of the guide body is positioned in the lower shifting path disposed to one side of the uppermost shifting path.

6. The gear-shifting device of claim 5, further comprising:
a return spring provided around the shaft and having both end portions supported by the stopper plate and the supporting plate, respectively, to provide elastic restoring force to the stopper plate when the stopper plate is rotated.

7. The gear-shifting device of claim 6, wherein supporting protrusions are formed on outer surfaces of the stopper plate and the supporting plate, the return spring is inserted into a pin member axially coupling the stopper plate and the supporting plate, and the respective supporting protrusions elastically support both ends of the return spring.

8. The gear-shifting device of claim 5, wherein catching grooves are formed to be depressed at both sides of the stopper protrusion, and return protrusions are formed protruding at side portions of the catching grooves.

9. The gear-shifting device of claim 5, wherein a seating groove is formed in a concave shape at an intermediate end of the stopper protrusion to cause the stopper guide to be caught.

10. The gear-shifting device of claim 5, wherein the supporting plate and the guide plate are integrally formed.

11. A gear-shifting device for a vehicle performing a gear-shifting operation based on a manual gear-shifting gate having a plurality of gear-shifting levels disposed one by one in a plurality of substantially straight passages vertically connected to one side or both sides along a neutral line and a diagonal passage diagonally formed from an end portion of the neutral line connected to an outermost substantially straight passage to an intermediate end of a lower substantially straight passage provided to one side of the outermost substantially straight passage, the gear-shifting device comprising:
a guide body having a first end portion connected to a control shaft, installed so that a second end portion is rotated at the first end portion as an axis in a rotational displacement that corresponds to a selecting path to perform a selecting operation along the neutral line and the diagonal passage of the manual gear-shifting gate, and installed to be moved in a substantially straight displacement that corresponds to a shifting path along an axis direction of the first end portion to perform a shifting operation along the straight passage;
a guide unit disposed to distinguish each shifting path on the selecting path in which the second end portion of the guide body is rotated and is configured to guide the second end portion of the guide body to be movable along the shifting path; and
a stopper unit having a stopper plate rotatably disposed at an end portion position of the selecting path in which the second end portion of the guide body is rotated,
wherein the stopper plate is configured to block the second end portion of the guide body from being positioned at the selecting path connected to an outermost substantially straight passage when the guide body rotates along the selecting path, and
wherein when the guide body performs a shifting operation to a gear-shifting level that corresponds to a substantially lower straight passage, and is then rotated and moved toward the selecting path connected to the outermost substantially straight passage, the stopper plate is rotated to allow a gear-shifting level disposed at the outermost substantially straight passage to be shifted.

* * * * *